J. PARKER AND T. WILKIE.
AUTOMOBILE TAIL LIGHT.
APPLICATION FILED MAR. 29, 1920.

1,406,485.

Patented Feb. 14, 1922.
2 SHEETS—SHEET 1.

INVENTORS
J. Parker
T. Wilkie
BY
ATTYS

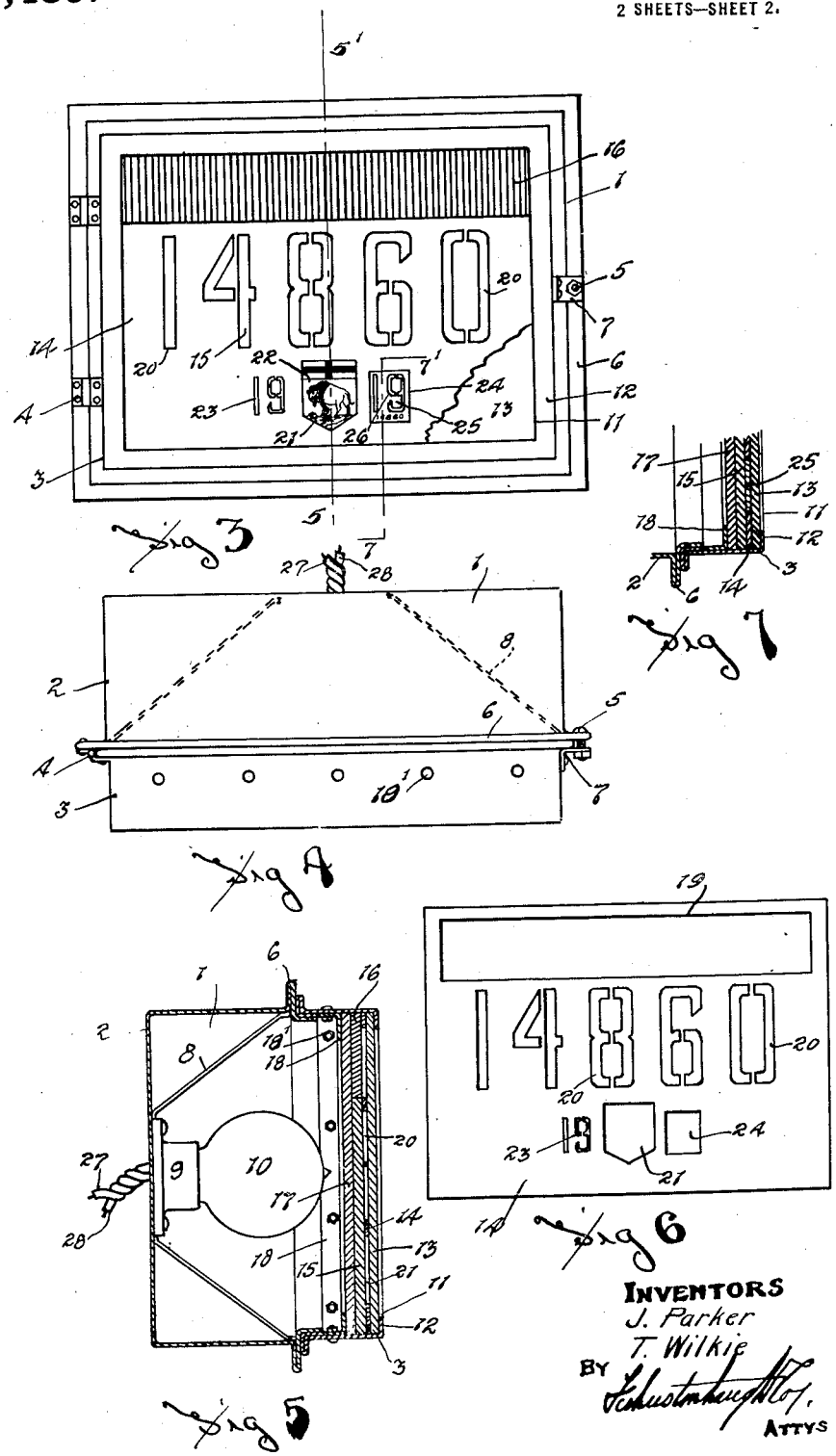

UNITED STATES PATENT OFFICE.

JOHN PARKER AND THEODORE WILKIE, OF WINNIPEG, MANITOBA, CANADA.

AUTOMOBILE TAIL LIGHT.

1,406,485.      Specification of Letters Patent.      Patented Feb. 14, 1922.

Application filed March 29, 1920. Serial No. 369,679.

*To all whom it may concern:*

Be it known that we, JOHN PARKER and THEODORE WILKIE, both of the city of Winnipeg, in the Province of Manitoba, Canada, have jointly invented certain new and useful Improvements in Automobile Tail Lights, of which the following is the specification.

The invention relates to improvements in automobile tail lights and the principal object of the invention is to provide a tail light which will present the license number or other necessary identification prominently and so that it can be seen clearly by day or night, a feature being that the identifying material is illuminated for night use and controlled from the steering wheel.

A further object of the invention is to construct the tail light in a simple and durable manner and so that it can be readily assembled and installed in an automobile and such that the identification plates can be removed if necessary and such that the year plate can be taken out and a new one put in without requiring the renewal of the other parts.

With the above more important and other minor objects in view, which will become more apparent as the description proceeds, the invention consists essentially in the arrangement and construction of parts hereinafter more particularly described and later pointed out in the appended claims, reference being had to the accompanying drawing in which:—

Fig. 3 is an enlarged detailed back view of the tail light.

Fig. 4 is a plan view of the same.

Fig. 5 is a vertical sectional view at 5—5' Fig. 3.

Fig. 6 is a back view of the metal plate.

Fig. 7 is an enlarged sectional view at 7—7' Fig. 3.

In the drawing like characters of reference indicate corresponding parts in the several figures.

Figure 1:
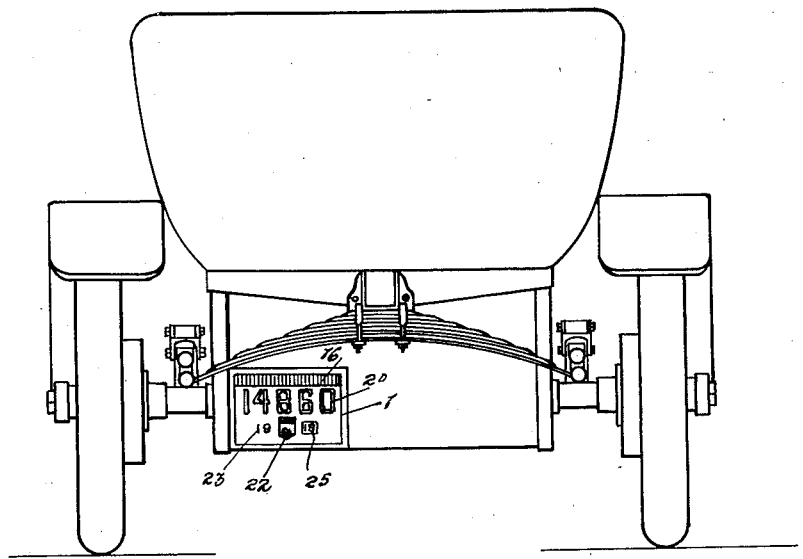
Fig. 1 is a rear view of an automobile equipped with our invention.
Figure 2:
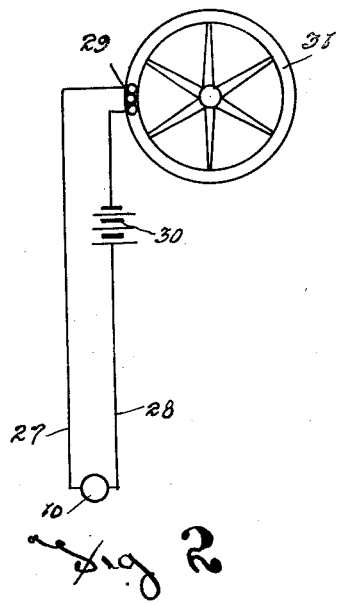
Fig. 2 is a view showing the electrical connections and as associated with the steering wheel.

1 is the tail light which is in the nature of a casing suitably mounted in a prominent place on the back part of the automobile body. The casing comprises a front body part 2 and a rear door 3 suitably hinged at 4 to the body part and fastened by a bolt 5 to a flange 6 provided on the body part, it being here noticed that the inner part of the flange passes within the closed door. The bolt 5 extends through an angle bracket 7 secured to the door. The door is comparatively deep and contains certain parts later described.

The interior of the body part is fitted with a flaring reflector 8 which converges towards a lamp socket 9 in which we mount an electric lamp globe 10 which is positioned centrally of the casing.

The door is formed to present a rectangular opening 11 surrounded by an inturned flange 12 and against this flange we locate a transparent material such as a plate of glass 13. Immediately to the inner side of the glass plate we locate a metal plate 14 and to the inner side of the metal plate we place two further glass plates 15 and 16 resting one on top of the other, the upper plate being preferably red whilst the lower is what might be termed white such as frosted. 17 is a further transparent plate of glass placed to the rear of the latter two plates. All the plates so assembled are held tightly in place against the flange 12 by an inserted removable flange 18 secured by removable bolts 18' to the door.

The metal plate 14 is provided at the top with an elongated signal opening 19 immediately behind which the red glass 16 appears so that when the lamp is illuminated the area bounded by the opening 19 shows red. Immediately beneath the opening 19 we perforate the metal plate at 20 to indicate a license number which in the present instance is shown as 14860.

More or less centrally beneath the license number we provide a further opening 21 and on the glass 15 at this point we paint or otherwise emblazon a coat of arms indicated at 22 and which in the present instance is the coat of arms of the Province of Manitoba, Canada.

To the left of the opening 21 we again perforate the metal plate as shown at 23 to represent the number 19 and to the right of the opening we cut a rectangular opening 24 in which we insert a small plate 25 perforated also at 26 to represent in the present instance the year index number 19. The license number is also written on the plate 25. The two numbers 19 to the right and left of the coat of arms are aligned so that they indicate the year 1919.

By having the plate 25 removable we are able to insert a new year index number plate each subsequent year so that the tail light without further change will do for many years.

In this connection we desire the license number to remain the same every year. The wires 27 and 28 connecting with the light socket lead to a suitable switch 29 located on the steering wheel 31 and a suitable source of electro-motive force 30 is contained in the circuit, the arrangement being such that when the switch is closed by the driver the lamp is illuminated.

As soon as the lamp is lighted the top part of the tail light shows a red light through the opening 19, the license number 14860 is illuminated by a white light as is also the year number 1919. The coat of arms will appear in whatever colors is chosen to make it. The license and year numbers show white on account of the inserted plate 15.

Each year one undoes the flange 18 and after removing the inner plates inserts a new plate 25 perforated to indicate another year and then re-inserts the plates and fastens the bolts 18'.

By having the metal plate comparatively thick it forms a support for the plate 25 which is fitted into the opening 24 and the closed front and back of the tin plate hold the inserted plate 25 securely in place.

It will be readily understood that we do not wish to be limited to the precise shape of the tail light as it could be made circular, triangular or any other form, depending on the whim of the manufacturer.

As the plate 25 has the license number written on it, it is only necessary for the authorities to see that the plates supplied to each automobile has the number thereon corresponding to the license number which that automobile owner previously had. In all cases the large license number as appearing on the tail light must correspond with the small number written on the removable number plate.

What we claim as our invention is:—

1. In a combined tail light and license plate for automobiles, a plate presenting an illuminated signal opening, an illuminated license number beneath the signal opening and illuminated year indicating plates beneath the license number and with one of the plates removable and bearing the license number.

2. In a combined tail light and license plate for automobiles, the combination with an illuminated casing, of an apertured door closing the casing and providing a marginal flange, a glass engaging the flange, a metallic plate bearing against the glass and perforated to provide a top signal opening, a license number beneath the signal opening and a year number beneath the license number, a frosted glass to the rear of the license and number perforations, a colored glass behind the signal opening, a retaining glass engaging the latter glasses and a removable flange engaging the retaining glass.

Signed at Winnipeg, this 15 day of November 1919.

JOHN PARKER.
THEODORE WILKIE.

In the presence of—
GERALD I. ROXBURGH,
K. B. WAKEFIELD.